United States Patent
Cherney

(10) Patent No.: US 9,148,034 B2
(45) Date of Patent: Sep. 29, 2015

(54) SR MOTOR ALTERNATIVE COOLING DEVICE AND METHOD

(75) Inventor: Mark John Cherney, Grant County, WI (US)

(73) Assignee: DEERE & COMPANY, Moline, IL (US)

( * ) Notice: Subject to any disclaimer, the term of this patent is extended or adjusted under 35 U.S.C. 154(b) by 585 days.

(21) Appl. No.: 13/360,993

(22) Filed: Jan. 30, 2012

(65) Prior Publication Data

US 2013/0193786 A1    Aug. 1, 2013

(51) Int. Cl.
*H02K 9/00* (2006.01)
*H02K 1/20* (2006.01)
*H02K 9/19* (2006.01)

(52) U.S. Cl.
CPC ... *H02K 1/20* (2013.01); *H02K 9/19* (2013.01)

(58) Field of Classification Search
CPC .............. H02K 1/20; H02K 9/19; H02K 1/32
USPC .......................................... 310/52, 54, 57–59
See application file for complete search history.

(56) References Cited

U.S. PATENT DOCUMENTS

| | | | |
|---|---|---|---|
| 3,801,843 A | 4/1974 | Corman et al. | |
| 4,377,894 A | 3/1983 | Yoshida | |
| 4,498,024 A | 2/1985 | Moretti et al. | |
| 5,365,132 A | 11/1994 | Hann et al. | |
| 5,859,482 A | 1/1999 | Crowell et al. | |
| 6,943,469 B2 * | 9/2005 | Nelson | 310/55 |
| 6,954,010 B2 | 10/2005 | Rippel et al. | |
| 7,839,031 B2 * | 11/2010 | Tilton et al. | 310/54 |
| 8,482,167 B2 * | 7/2013 | Erfanfar et al. | 310/52 |
| 8,866,351 B2 * | 10/2014 | Le Besnerais | 310/58 |
| 2005/0206252 A1 * | 9/2005 | Georg et al. | 310/59 |
| 2008/0100159 A1 * | 5/2008 | Dawsey et al. | 310/54 |
| 2008/0136294 A1 * | 6/2008 | Powers et al. | 310/67 R |
| 2009/0058204 A1 * | 3/2009 | Sirois | 310/59 |
| 2010/0102649 A1 | 4/2010 | Cherney et al. | |
| 2012/0274159 A1 * | 11/2012 | Le Besnerais | 310/54 |

* cited by examiner

*Primary Examiner* — Thanh Lam

(57) ABSTRACT

A system for cooling an electrical machine is disclosed. The electrical machine includes a rotor, a stator, and at least one cooling pathway extending through the stator. During operation of the electrical machine, fluid flows through the pathway and carries away heat generated by the electrical machine.

20 Claims, 6 Drawing Sheets

SR MOTOR ALTERNATIVE COOLING DEVICE AND METHOD

BACKGROUND

1. Field of the Invention

The present disclosure relates to a system for cooling an electrical machine. More particularly, the present disclosure relates to a system for cooling stator laminations and coils of the electrical machine.

2. Description of the Related Art

Electrical machines, including motors and generators, operate by rotating a rotor relative to a stator that surrounds the rotor. Electrical machines generate heat during operation that flows radially outward from the rotor to the stator to an exterior housing. To cool the electrical machine, air or a liquid coolant may be directed through channels located in the exterior housing, through apertures located in sealed laminations of the stator, or through channels located between coils of the stator, for example.

SUMMARY

The present disclosure provides a system for cooling an electrical machine. The electrical machine includes a rotor, a stator, and at least one cooling tube extending through the stator. During operation of the electrical machine, fluid flows through the tube and carries away heat generated by the machine.

According to an embodiment of the present disclosure, an electrical machine is provided including: a rotor; and a stator. The stator including a lamination stack that includes a plurality of laminations aligned coaxially, the lamination stack defining a central bore sized to receive the rotor and defining at least one cooling bore, the lamination stack defining a first end and a second end, a fluid input plate disposed within the lamination stack and spaced apart from the first end and second end; and a cooling fluid positioned in the at least one cooling bore.

According to another embodiment of the present disclosure, an electrical machine fluid transport device is provided. The device including a body having a first side and a second side; a fluid input defined in the body; an internal passageway defined in the body and fluidly linked to the input; a first output defined in the first side and fluidly linked to the internal passageway; and a second output defined in the second side and fluidly linked to the internal passageway.

According to yet another embodiment of the present disclosure, a plate for use with a motor stator is provided. The plate includes a body sized and shaped to abut a lamination of a stack of laminations of the motor stator. The body including: a first output orifice positioned to align with a fluid conduit of the lamination, and a first facet positioned adjacent the first output orifice to receive fluid from the first output orifice, the first facet including a first facet output, the first facet sized and shaped and located such that fluid exiting the first facet via the first facet output is directed onto a winding of the motor stator.

According to yet another embodiment of the present disclosure, an electrical machine is provided. The machine includes a rotor and a stator. The stator including at least one coil; a lamination stack that includes a plurality of laminations aligned coaxially, the lamination stack defining a central bore sized to receive the rotor and defining at least one cooling bore, the lamination stack defining a first end and a second end; and an end piece having at least one fluid outlet defined therein, the at least one fluid outlet including spray nozzles that receive fluid from within the lamination stack and direct the fluid onto the at least one coil.

BRIEF DESCRIPTION OF THE DRAWINGS

The above-mentioned and other features of the present disclosure will become more apparent and the present disclosure itself will be better understood by reference to the following description of embodiments of the present disclosure taken in conjunction with the accompanying drawings, wherein.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION

Figure 1:
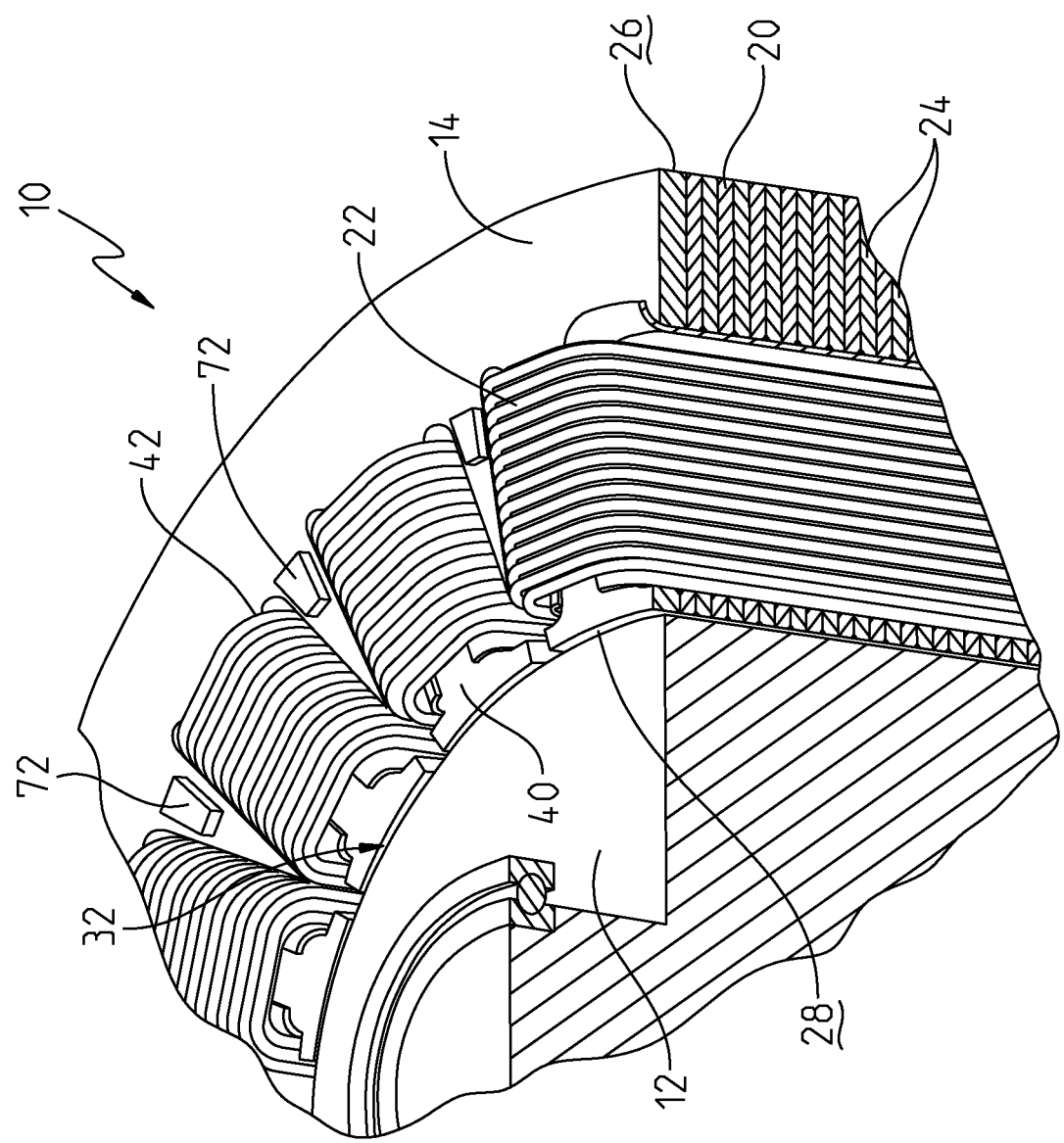
FIG. 1 is a perspective view of an embodiment of a motor including a rotor and a stator with cooling pathways extending therethrough.

FIG. 1 provides an illustrative electrical machine in the form of motor 10. Although the electrical machine is illustrated and described herein as motor 10, machines of the present disclosure may also include generators, for example. Motor 10 includes rotor 12, stator 14, and, optionally, housing (not shown) surrounding stator 14. In operation, power is supplied to motor 10 to rotate rotor 12 relative to the surrounding stator 14.

Stator 14 includes lamination stack 20 and coils 22. Lamination stack 20 includes a plurality of individual laminations 24 layered and secured together axially. Lamination stack 20 further includes input plates 44 and end caps 16 therein. Adjacent laminations 24, input plates 44, and end caps 16 may be secured together by welding, with a bonding agent, with a fastening device, or by another suitable technique.

Figure 3:
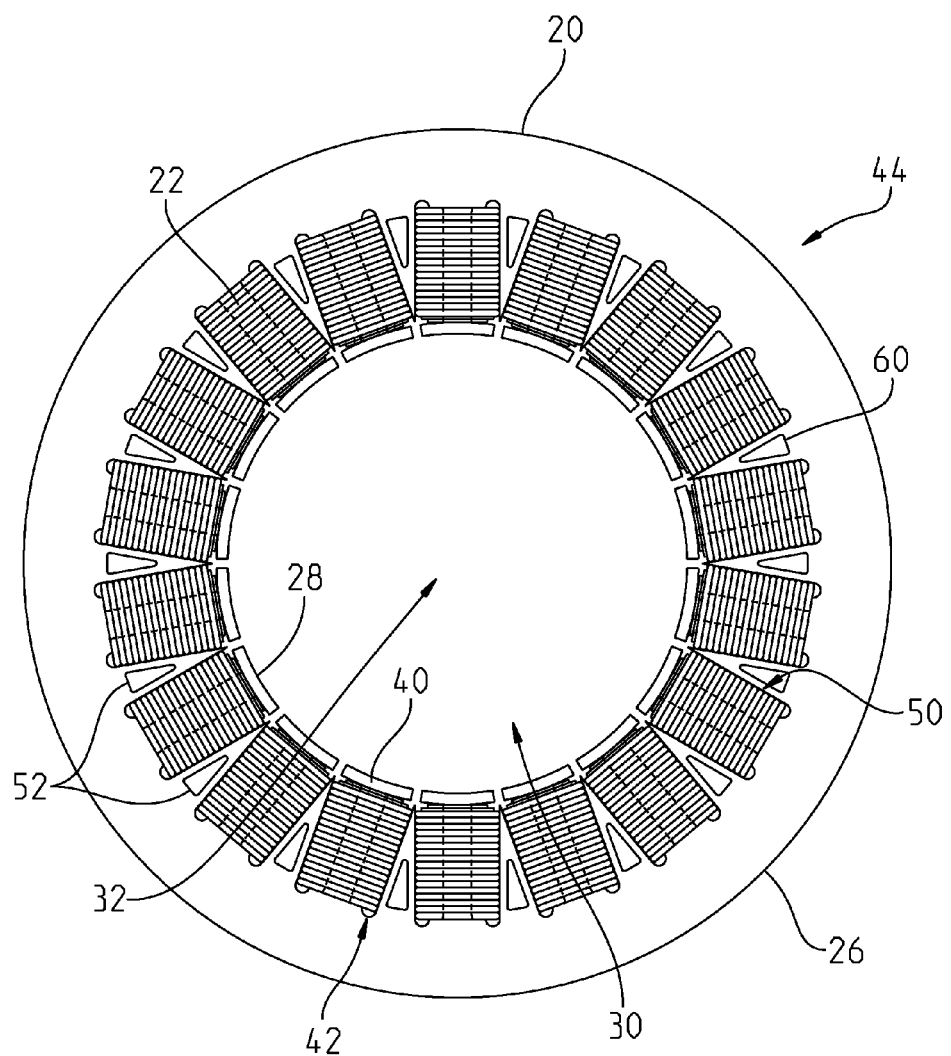
FIG. 3 is a top plan view of the stator of FIG. 1 shown with a stator end cap removed.

As shown in FIG. 3, each lamination 24 is a disk-shaped body constructed of electrical steel or another suitable ferromagnetic material. Lamination 24 includes an outer periphery 26 and an inner periphery 28 that defines a central aperture 30. When laminations 24 are layered together, adjacent central apertures 30 align to form a central bore 32 that extends axially through lamination stack 20. Central bore 32 is sized to receive rotor 12 (FIG. 1). Inner periphery 28 of lamination 24 also includes a plurality of radially-spaced winding teeth 40. Adjacent winding teeth 40 define winding slots 42 therebetween.

Figure 2:
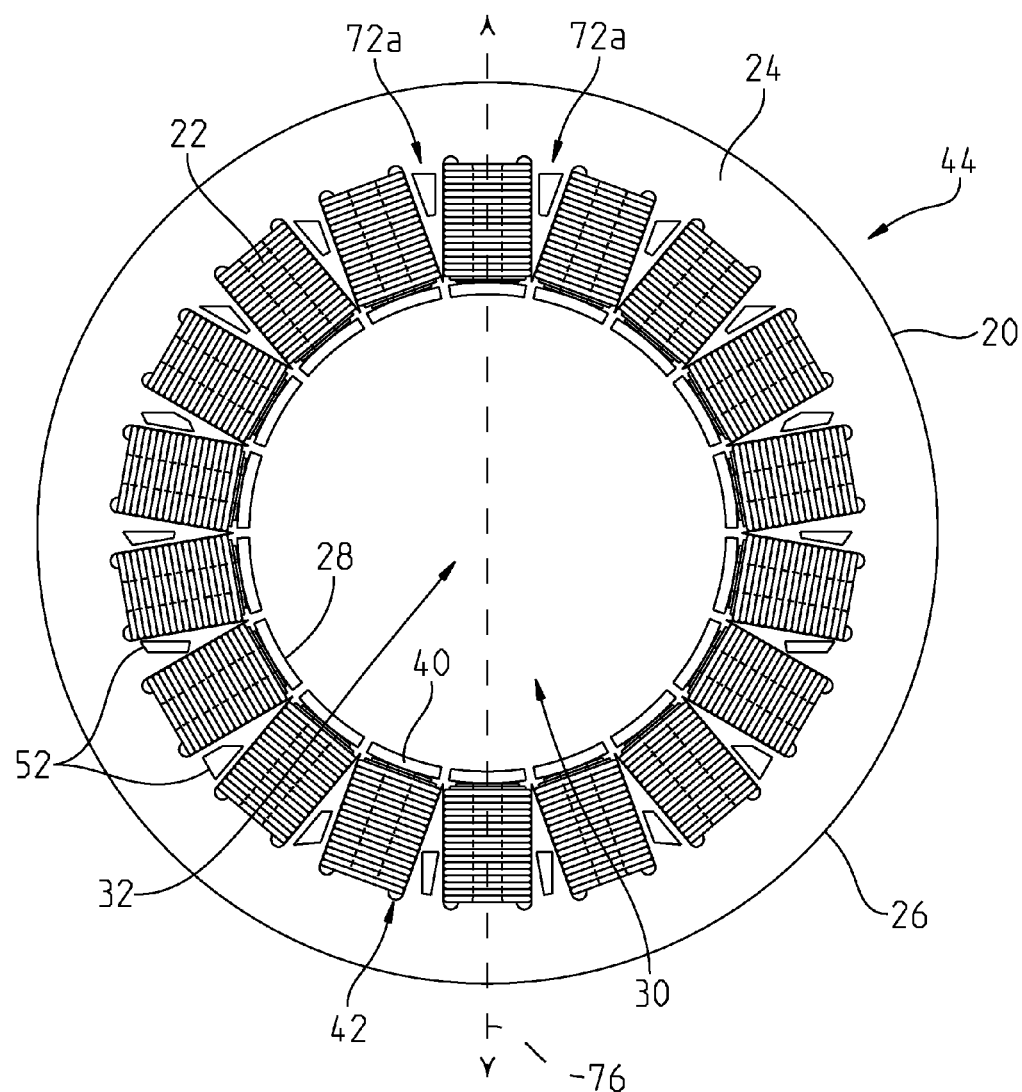
FIG. 2 is a top plan view of the stator of FIG. 1 shown with a stator end cap in place.

As shown in FIG. 2, each end of lamination stack 20 includes an end cap 16. End cap 16 is a non-ferromagnetic disk-shaped piece that is substantially similarly dimensioned to laminations 24. End caps 16 thus have winding slots 42 that align with winding slots 42 of lamination stack 20. Additional features of end caps 16 are discussed below.

When laminations 24 are layered together with end caps 16, wires, such as insulated copper wires, extend through winding slots 42 and wrap around winding teeth 40 to form coils 22. Outer periphery 26 of lamination 24 may include any number of alignment features (not shown), such as indentations, protrusions, and/or markings, to indicate when adjacent laminations 24 are properly aligned.

Referring still to FIG. 3, each lamination 24 also includes a plurality of flow apertures 50. Flow apertures 50 are positioned to be between adjacent coils 22 of stator 14, as shown in FIG. 3. In FIG. 3, endcap 16 is removed to show flow apertures 50. Placing flow apertures 50 between adjacent coils 22 cools the coils 22 directly, rather than indirectly through lamination stack 20. In addition to apertures 50, cooling tubes 60 may be inserted therein between adjacent coils 22 and hydroformed against coils 22 as described with respect to cooling bores 52 of lamination stack 20 in U.S. patent application Ser. No. 12/262,721 (METHOD OF MANUFACTURING COOLING CHANNELS IN STATOR LAMINATIONS, filed Oct. 31, 2008) which is expressly incorporated herein by reference.

Flow apertures 50 may be formed in laminations 24 by any suitable method. For example, after (or while) lamination 24 is stamped from a metal sheet, flow apertures 50 may be formed by cutting or punching holes into the metal sheet. As another example, flow apertures 50 may be formed during a molding process. Flow apertures 50 may be circular, oval, triangular, or another suitable shape. The illustrated embodiment includes triangular apertures 50. When laminations 24 are layered together, adjacent apertures 50 cooperate to form a plurality of cooling bores 52 that extend through lamination stack 20. In an embodiment, cooling bores 52 extend through lamination stack 20 in a direction essentially parallel to central bore 32. This parallel arrangement may be achieved by aligning adjacent flow apertures 50 directly on top of one another.

While the specification has described flow apertures 50 as being defined by laminations 24, cooling tubes (not shown) may also be placed within flow apertures 50 to define cooling bores 52. Cooling tubes may be constructed of a thermally conductive material, such as copper, a copper alloy, aluminum, or an aluminum alloy, or another suitable material, such as steel or a steel alloy. Embodiments are also envisioned where cooling tubes are non-ferrous but still thermally conductive.

Figure 4:
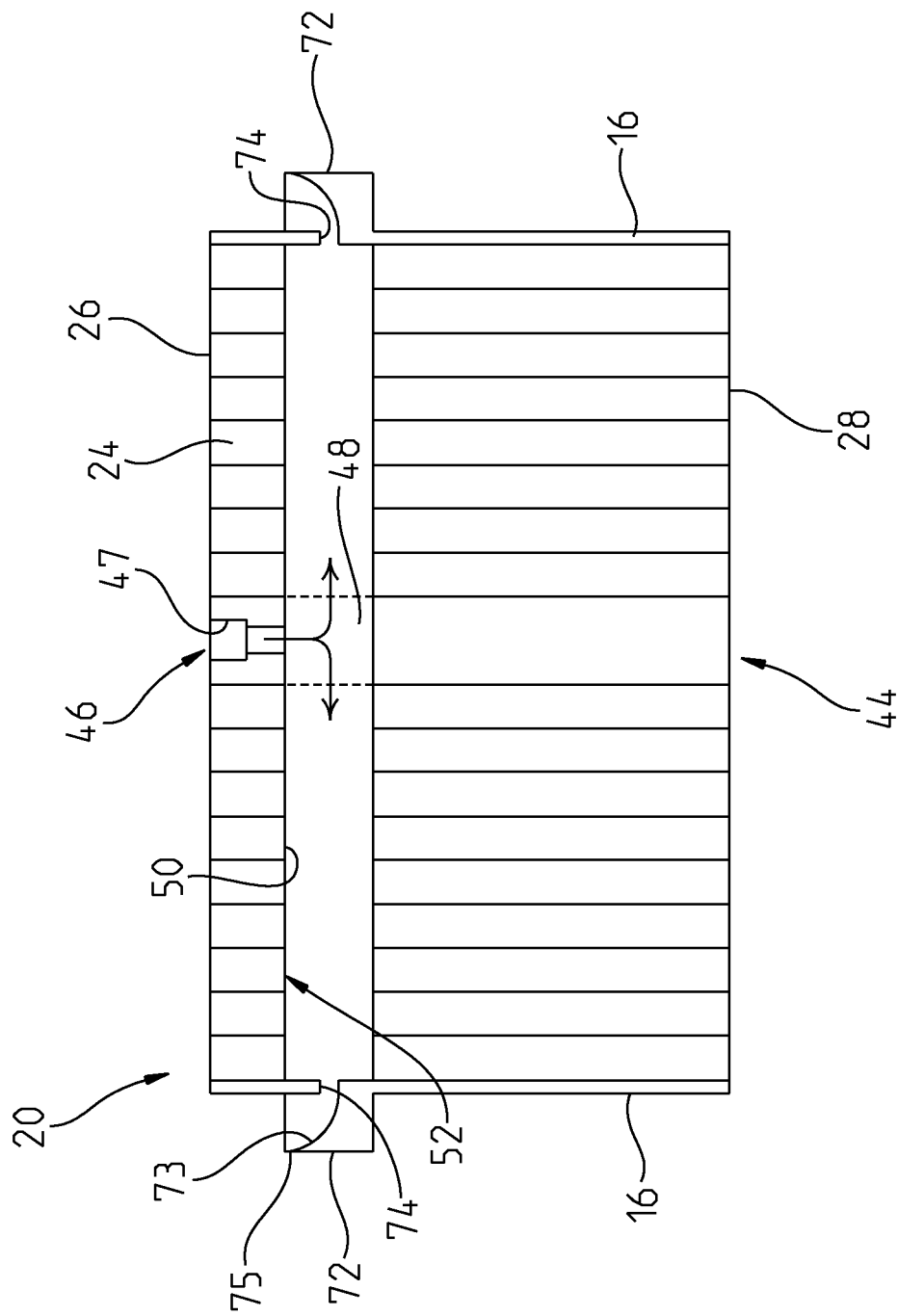
FIG. 4 is a schematic illustration of cross-section of the stator of FIG. 1.
Figure 5:
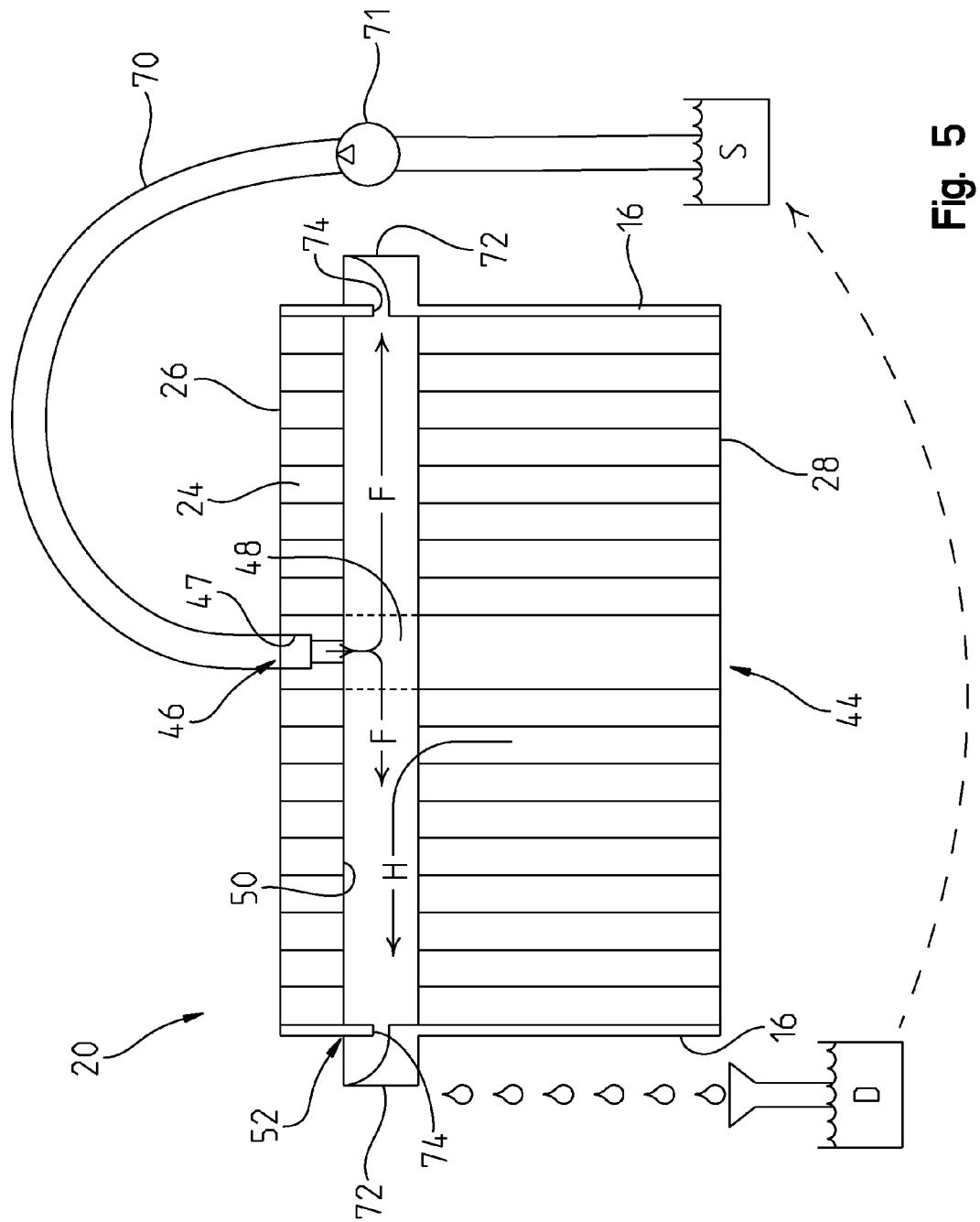
FIG. 5 is a schematic illustration of cross-section of the stator of FIG. 1 showing fluid travel therein.
Figure 6:
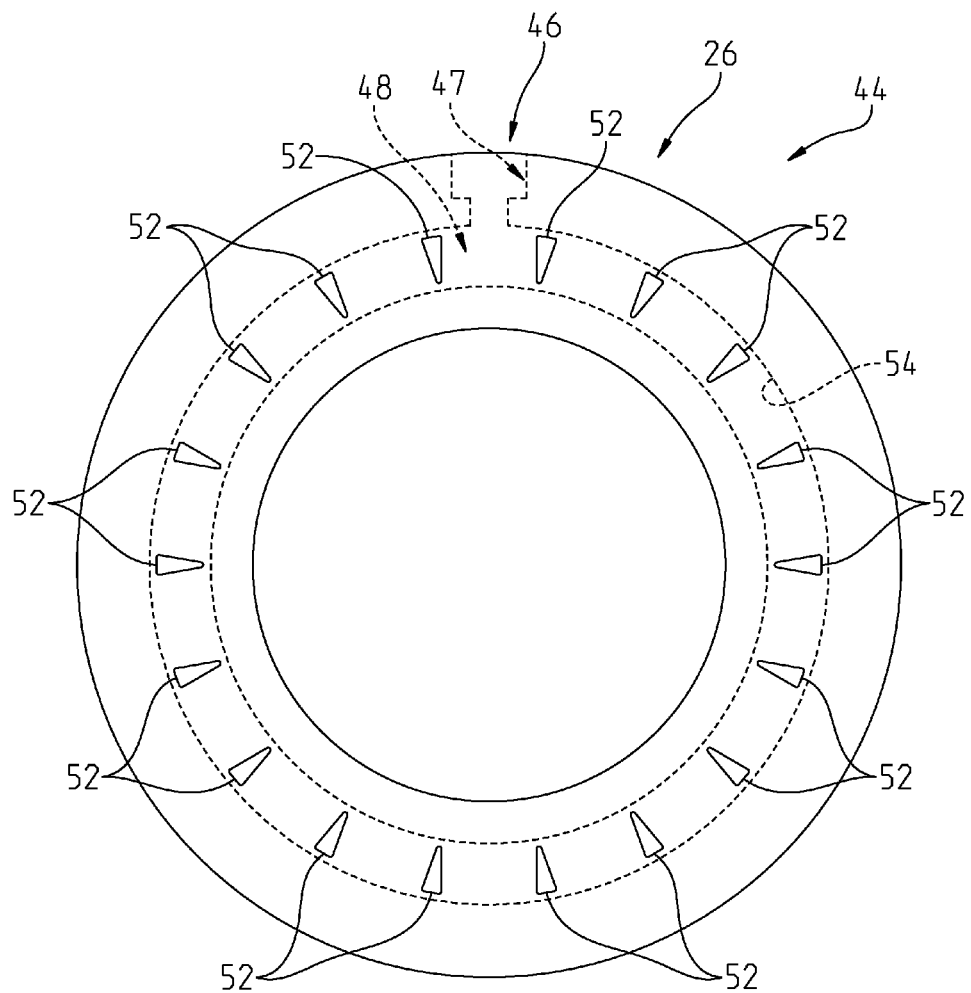
FIG. 6 is a top plan view of the input plate of the stator of FIG. 1.

In addition to laminations 24, stator 14 also includes one or more input plates 44, FIG. 6. In the illustrated embodiment of FIGS. 4 & 6, input plate 44 is similarly sized to lamination 24 with respect to outer and inner periphery 26, 28. However, input plate 44 is thick enough such that input aperture 46 is defined therein and is non-ferrromagnetic. Additionally, input plates 44 are envisioned having a greater diameter than laminations 24. Input aperture 46 is a multi-diametered aperture that extends from outer periphery 26 to portion 48 of cooling bore 52. Portion 48 forms a "T" with input aperture 46. In one embodiment, an input aperture 46 is provided for each cooling bore 52. In another embodiment, shown in FIG. 6, a single input aperture 46 is provided and input plate 44 includes a circumferential passageway 54 therein that link input aperture 46 to all cooling bores 52. Furthermore, it should be appreciated that embodiments are envisioned where multiple input apertures 46 are provided and each is coupled to more than one but less than all cooling bore 52. In the embodiments where a single input aperture 46 serves more than one cooling bore 52, circumferential pathways 54 are provided within input plates 44. Outer portion 47 of input aperture 46 is sized to receive a hose or other conduit that seals to outer portion 47 to supply cooling oil thereto. While FIGS. 4 and 5 show stator 14 having a single input plate 46, embodiments are envisioned where more than one input plate is disposed within lamination stack 20. Additionally, while FIG. 6 shows one side of input plate 44 with portions of cooling bores 52 defined therein, it should be appreciated that the opposing side also contains portions of cooling bores 52 defined therein.

As previously noted, endplates 16 are similarly dimensioned to laminations 24. Endplates have distribution facets 72 and output metering apertures 74. Output metering apertures 74 are aligned with cooling bores 52. The sizing of output metering apertures 74 is customized to provide desired flow characteristics for the particular location on stator 14 where the aperture is located. Distribution facets 72 are areas of increased thickness sized to fit between adjacent coils end windings of coils 22. Distribution facets 72 are sized and shaped to receive cooling oil from output metering apertures 74 and direct it to adjacent end windings of coils 22. Motor 10, in operation, has a defined orientation relative to gravity. Accordingly, distribution facets 72 are each customized in recognition that each output metering aperture 74 can assume a unique relation to adjacent end windings for coils 22 and gravity.

The cooling fluid may include, for example, oil, water, a mixture of water and ethylene glycol, a mixture of water and propylene glycol, or another suitable heat transfer fluid. Exemplary cooling fluids are capable of removing more heat from motor 10 than air, for example. As illustrated schematically in FIG. 5, the cooling fluid travels from source tank S, into input aperture 46 of input plate 44 (via pump 71 and a filter), inward to portion 48, laterally through cooling tube 60 (where present) through lamination stack 20, out of output metering apertures 74, into distribution facets 72, along end windings of coil 22 (adjacent to facets 72 and not shown in FIG. 5), and ultimately to destination tank D. The direction of fluid flow is indicated by arrow F. Heat generated by motor 10 is transferred from lamination stack 20, through the walls of cooling tubes 60 (where present), and into the cooling fluid flowing therein. The direction of heat flow is indicated by arrow H. The heated fluid that is delivered to destination tank D may be cooled and recycled back to source tank S.

Referring still to FIG. 5, input aperture 46 of input plate 44 is coupled to fluid lines 70. Fluid lines 70 may be constructed of flexible rubber tubing, for example. As illustrated schematically in FIG. 5, fluid lines 70 direct the cooling fluid from source tank S to input aperture 46 of input plate 44 via pump 71. According to an exemplary embodiment of the present disclosure, fluid lines 70 are also coupled to a housing in which motor 10 is located. The housing contains the fluid that is output from apertures 74 and flowed across the end windings of coils 22 (FIG. 2).

To promote even cooling of lamination stack 20, substantially equal flow is desired in all cooling bores 52. However, it will be appreciated that gravity operates on motor 10 and the fluid. For embodiments where a single inlet aperture 46 is coupled to more than one cooling bore 52, the cooling bores 52 are potentially located at different heights (due to the differing radial locations). For this reason, or any other reason tending to cause uneven distribution, the sizing of output metering apertures 74 is customized. For any cooling bore 52 that would naturally tend to collect an increased amount of fluid therein, such cooling bore 52 is provided with a smaller output metering aperture 74 to equalize the flow experienced by that cooling bore 52 with other cooling bores 52. Furthermore, output metering apertures 74 are sized such that the collective output of all output metering apertures 74 for a given input aperture 46 is equal to the supply of fluid being input to the input aperture 46 that serves the one or more output metering apertures 74. Accordingly, the situation does not arise where certain cooling bores 52 are receiving adequate cooling fluid while other cooling bores 52 receive less than necessary amounts.

While the above customization has been described as seeking uniform flow and uniform cooling. It should be appreciated that the flow characteristics can be adjusted to non-uniform flow if operational designs and parameters result in non-uniform heat production in motor 10.

Once the cooling fluid is expelled from output metering apertures, the fluid encounters distribution facets 72. Distribution facets 72 define pooling vessels 73 each having a lip 75. Pooling vessels 73 each fill up and ultimately overflow with fluid, similarly to that often seen in water fountains. Distribution facets 72 are sized and shaped to direct fluid onto adjacent end windings of coils 22. In that the orientation of the various facets 72 relative to gravity is known, facets 72 are sized and shaped differently to direct fluid to adjacent end windings of coils 22. As shown most clearly in FIG. 2, facets 72 on either side of vertical centerline 76 are mirror images of each other. Facets 72a, on either side of the top center coil 22 are shaped such that fluid overflows onto both adjacent coils 22. The balance of the facets 72 are shaped such that fluid overflows proximate the higher end of the lower adjacent coil 22. This results in gravity causing increased flow over a greater portion of the end windings of coils 22.

While facets 72 are shown and described as defining a pooling vessels 73, embodiments are envisioned where facets 72 provide sprays that, via pressurization of the fluid, can eject the fluid to be sprayed onto adjacent coils 22. In such embodiments, spray can be applied to both adjacent coils 22 rather than just those for which gravity would allow the fluid to fall downwardly onto.

While this invention has been described as having preferred designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An electrical machine including:
   a rotor; and
   a stator including:
   a lamination stack that includes a plurality of laminations aligned coaxially, the lamination stack defining a central bore sized to receive the rotor and defining at least one cooling bore, the lamination stack defining a first end and a second end;
   a fluid input plate disposed within the lamination stack and spaced apart from the first end and second end; and
   a cooling fluid positioned in the at least one cooling bore.

2. The electrical machine of claim 1, further including a plurality of cooling bores spaced radially about the lamination stack.

3. The electrical machine of claim 1, wherein the fluid input plate is non-ferromagnetic.

4. The electrical machine of claim 1, wherein the fluid input plate includes a fluid input aperture and at least one fluid output aperture.

5. The electrical machine of claim 4, wherein the at least one fluid output aperture aligns with the at least one cooling bore to allow fluid flow therebetween.

6. The electrical machine of claim 1, wherein the stator includes:
   a plurality of teeth extending into the central bore of the lamination stack; and
   a plurality of coils wrapped around the plurality of teeth;
   wherein the at least one cooling bore is disposed between and adjacent to first and second coils of the stator.

7. The electrical machine of claim 1, wherein the stator includes:
   an end plate having at least one output aperture aligned with the at least one cooling bore.

8. The electrical machine of claim 5, wherein the end plate includes a facet that directs fluid from the at least one cooling bore onto an adjacent coil.

9. The device of claim 7, wherein the body includes a central aperture sized and shaped to receive an electrical motor rotor therein.

10. The device of claim 7, further including first and second sides are planar and parallel.

11. The device of claim 1, wherein the first end and the second end are aligned in a direction perpendicular to the first and second sides.

12. The device of claim 7, wherein the first and second outputs are sized to define a shape that fits between adjacent coils of a motor stator.

13. The device of claim 7, further including:
   a third output defined in the first side and fluidly linked to the internal passage way; and
   a fourth output defined in the second side and fluidly linked to the internal passageway, the third and fourth outputs being aligned in a direction perpendicular to the first and second sides.

14. The electrical machine of claim 7, wherein the body approximates a ring in shape.

15. The electrical machine of claim 7, wherein the portions of the body in which the outputs are formed are non-ferromagnetic.

16. The plate of claim 14, further including a second output orifice positioned to align with a fluid conduit of the lamination, and a second facet positioned adjacent the second output orifice to receive fluid from the second output orifice, the second facet including a second facet output, the second facet sized and shaped and located such that fluid exiting the second facet via the second facet output is directed onto a winding of the motor stator.

17. The plate of claim 15, wherein the first facet is differently shaped than the first facet.

18. The plate of claim 15, wherein the first output orifice is differently sized than the second output orifice.

19. The plate of claim 14, wherein the body is non-ferromagnetic.

20. The plate of claim 14, wherein the fluid exits the first facet output by overflowing over a lip.

\* \* \* \* \*